US010611615B2

(12) United States Patent
Valfridsson et al.

(10) Patent No.: US 10,611,615 B2
(45) Date of Patent: Apr. 7, 2020

(54) FLOOR CONVEYOR

(71) Applicant: Toyota Material Handling Manufacturing Sweden AB, Mjölby (SE)

(72) Inventors: Göran Valfridsson, Mjölby (SE); Terence Rogers, Linköping (SE)

(73) Assignee: Toyota Material Handling Manufacturing Sweden AB, Mjolby (SE)

( * ) Notice: Subject to any disclaimer, the term of this patent is extended or adjusted under 35 U.S.C. 154(b) by 0 days.

(21) Appl. No.: 15/650,200

(22) Filed: Jul. 14, 2017

(65) Prior Publication Data
US 2018/0016126 A1   Jan. 18, 2018

(30) Foreign Application Priority Data

Jul. 14, 2016   (EP) ..................................... 16179517

(51) Int. Cl.
*B66F 9/07*    (2006.01)
*B66F 9/06*    (2006.01)
(Continued)

(52) U.S. Cl.
CPC ........ *B66F 9/0755* (2013.01); *B62D 15/0265* (2013.01); *B66F 9/063* (2013.01);
(Continued)

(58) Field of Classification Search
CPC ................ B66F 9/0755; B66F 9/07581; B66F 9/07568; B66F 9/063; G05D 1/024; G05D 2201/0216; B62D 15/0265
See application file for complete search history.

(56) References Cited

U.S. PATENT DOCUMENTS

| | | | |
|---|---|---|---|
| 4,077,486 A | 3/1978 | Blakeslee et al. | |
| 4,318,451 A | 3/1982 | Liggett | |

(Continued)

FOREIGN PATENT DOCUMENTS

| | | | |
|---|---|---|---|
| EP | 0237878 A2 | 9/1987 | |
| EP | 1462880 A2 | 9/2004 | |

(Continued)

OTHER PUBLICATIONS

The extended search report from the European Patent Office, dated Jan. 27, 2017, 3 Pages, for European Patent Application No. 16179517.4.

(Continued)

*Primary Examiner* — Rodney A Butler
(74) *Attorney, Agent, or Firm* — Quarles & Brady LLP

(57) ABSTRACT

Systems and methods for a floor conveyor include a control unit and a sensor device, the control unit operable to control the travel functions of the floor conveyor, the sensor device arranged to be able to provide the control unit with sensor data, the sensor device arranged such that it can detect objects in a plane, the plane extending along the a first side of the floor conveyor, the plane comprises a stop section, the floor conveyor arranged such that if an object is detected in the stop section the floor conveyor is stopped by control of the travel function from the control unit upon receipt by it of a sensor data indicating the object being positioned in the stop section, the stop section also extending along a section of a second side of the floor conveyor, the second side being essentially perpendicular to the first side.

18 Claims, 7 Drawing Sheets

(51) Int. Cl.
    *B62D 15/02*     (2006.01)
    *G05D 1/02*     (2020.01)
    *B66F 9/075*     (2006.01)

(52) U.S. Cl.
    CPC ...... *B66F 9/07568* (2013.01); *B66F 9/07581* (2013.01); *G05D 1/024* (2013.01); *G05D 2201/0216* (2013.01)

(56) References Cited

U.S. PATENT DOCUMENTS

| | | |
|---|---|---|
| 4,464,659 A | 8/1984 | Bergqvist |
| 4,733,740 A | 3/1988 | Bigowsky et al. |
| 5,107,946 A | 4/1992 | Kamimura et al. |
| 5,111,401 A | 5/1992 | Everett, Jr. et al. |
| 5,545,960 A | 8/1996 | Ishikawa |
| 5,570,285 A | 10/1996 | Asaka et al. |
| 5,602,425 A | 2/1997 | Wilhelmi et al. |
| 5,684,696 A | 11/1997 | Rao et al. |
| 5,796,354 A | 8/1998 | Cartabiano et al. |
| 5,913,919 A | 6/1999 | Bauer et al. |
| 5,938,710 A | 8/1999 | Lanza et al. |
| 5,939,986 A | 8/1999 | Schiffbauer et al. |
| 5,976,354 A | 11/1999 | Powers et al. |
| 6,038,501 A | 3/2000 | Kawakami |
| 6,173,215 B1 | 1/2001 | Sarangapani |
| 6,338,013 B1 | 1/2002 | Ruffner |
| 6,481,525 B1 | 11/2002 | Bloch et al. |
| 6,564,906 B1 | 5/2003 | Haack et al. |
| 6,595,306 B2 | 7/2003 | Trego et al. |
| 6,681,638 B2 | 1/2004 | Kazerooni et al. |
| 6,694,233 B1 | 2/2004 | Duff et al. |
| 6,784,800 B2 | 8/2004 | Orzechowski |
| 6,883,625 B2 | 4/2005 | Trego et al. |
| 6,938,720 B2 | 9/2005 | Menjak et al. |
| 6,950,035 B2 | 9/2005 | Tanaka et al. |
| 7,017,689 B2 | 3/2006 | Gilliland et al. |
| 7,124,027 B1 | 10/2006 | Ernst, Jr. et al. |
| 7,211,980 B1 | 5/2007 | Bruemmer et al. |
| 7,259,662 B2 | 8/2007 | Lewis |
| 7,430,455 B2 | 9/2008 | Casey et al. |
| 7,860,653 B2 | 12/2010 | Joe et al. |
| 7,931,431 B2 | 4/2011 | Benedict et al. |
| 8,020,657 B2 | 9/2011 | Allard et al. |
| 8,072,309 B2 | 12/2011 | Kraimer et al. |
| 8,193,903 B2 | 6/2012 | Kraimer et al. |
| 8,195,366 B2 | 6/2012 | McCabe et al. |
| 8,392,065 B2 | 3/2013 | Tolstedt et al. |
| 8,452,464 B2 | 5/2013 | Castaneda et al. |
| 8,577,551 B2 | 11/2013 | Siefring et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,970,363 B2 | 3/2015 | Kraimer et al. |
| 9,002,581 B2 | 4/2015 | Castaneda et al. |
| 9,082,293 B2 | 7/2015 | Wellman et al. |
| 9,122,276 B2 | 9/2015 | Kraimer et al. |
| 9,207,673 B2 | 12/2015 | Pulskamp et al. |
| 9,493,184 B2 | 11/2016 | Castaneda et al. |
| 9,522,817 B2 | 12/2016 | Castaneda et al. |
| 9,645,968 B2 | 5/2017 | Elston et al. |
| 9,651,930 B2 | 5/2017 | Nakatani et al. |
| 9,908,527 B2 | 3/2018 | Elston et al. |
| 10,179,723 B2 | 1/2019 | Kraimer et al. |
| 2002/0035331 A1 | 3/2002 | Brockway et al. |
| 2002/0163495 A1 | 11/2002 | Doynov |
| 2002/0178830 A1 | 12/2002 | Kazerooni et al. |
| 2005/0017858 A1 | 1/2005 | Gross |
| 2005/0052412 A1 | 3/2005 | McRae et al. |
| 2005/0247508 A1 | 11/2005 | Gilliland et al. |
| 2006/0125806 A1 | 6/2006 | Voyles et al. |
| 2006/0180381 A1 | 8/2006 | Sonderegger et al. |
| 2006/0229774 A1 | 10/2006 | Park et al. |
| 2006/0238156 A1 | 10/2006 | Kim |
| 2006/0250255 A1 | 11/2006 | Flanagan |
| 2006/0276958 A1 | 12/2006 | Crumbaugh |
| 2007/0112461 A1 | 5/2007 | Zini et al. |
| 2007/0193798 A1 | 8/2007 | Allard et al. |
| 2008/0071429 A1 | 3/2008 | Kraimer et al. |
| 2008/0129445 A1 | 6/2008 | Kraimer et al. |
| 2009/0032560 A1 | 2/2009 | Strandberg et al. |
| 2009/0076664 A1 | 3/2009 | McCabe et al. |
| 2010/0014555 A1 | 1/2010 | Twerdochlib |
| 2010/0063680 A1 | 3/2010 | Tolstedt et al. |
| 2010/0106344 A1 | 4/2010 | Edwards et al. |
| 2010/0114405 A1* | 5/2010 | Elston ................ B66F 9/0755 701/2 |
| 2010/0157736 A1* | 6/2010 | Riordan ................ G01S 15/87 367/88 |
| 2015/0057843 A1 | 2/2015 | Kraimer et al. |
| 2016/0223655 A1* | 8/2016 | Weiss ................ G01S 7/4817 |
| 2018/0105033 A1 | 4/2018 | Schnapp et al. |
| 2018/0105215 A1 | 4/2018 | Schnapp et al. |
| 2018/0208258 A1 | 7/2018 | Lynn et al. |

FOREIGN PATENT DOCUMENTS

| | | |
|---|---|---|
| EP | 1560143 A2 | 8/2005 |
| GB | 1548307 | 7/1979 |
| JP | H07138000 A | 5/1995 |
| JP | 2002104800 A | 4/2002 |
| WO | 8702484 A1 | 4/1987 |
| WO | 02054215 A1 | 7/2002 |
| WO | 2012/115920 A2 | 8/2012 |
| WO | 2012/139575 A1 | 10/2012 |
| WO | 2012139575 A1 | 10/2012 |
| WO | 2018075013 A1 | 4/2018 |

OTHER PUBLICATIONS

Carelli, et al., Corridor Navigation and Wall-Following Stable Control for Sonar-Based Mobile Robots, Robotics and Autonomous Systems, 2003, 45(3-4):235-247.

Duff, et al., Automation of an Underground Mining Vehicle Using Reactive Navigation and Opportunistic Localization, in Proceedings 2003 IEEE/RSJ International Conference on Intelligent Robots and Systems (IROS 2003)(Cat. No. 03CH37453), vol. 4, pp. 3775-3780.

Duff, et al., Wall Following with Constrained Active Contours, Field and Service Robotics, STAR 24, 2006, pp. 51-60.

Dunbabin, et al., Autonomous Excavation Using a Rope Shovel, Journal of Field Robotics, 2006, 23(6-7):379-394.

Durrant-Whyte, et al., Field and Service Applications—An Autonomous Straddle Carrier for Movement of Shipping Containers—From Research to Operational Autonomous Systems, IEEE Robotics & Automation Magazine, 2007, pp. 14-23.

Gaertner, et al., A Modular Control Station for Semiautonomous Mobile Systems, in Proceedings of the Intelligent Vehicles' 94 Symposium, IEEE 1994, pp. 405-410.

Garibotto, et al., Industrial Exploitation of Computer Vision in Logistic Automation: Autonomous Control of an Intelligent Forklift Truck, in Proceedings of the 1998 IEEE International Conference on Robotics and Automation, pp. 1459-1464.

Garibotto, et al., Computer Vision Control of an Intelligent Forklift Truck, in Proceedings of Conference on Intelligent Transportation Systems, IEEE, 1997, pp. 589-594.

Graefe, et al., Robot Navigation Without Calibration, in Proceedings of 2004 IEEE/RSJ International Conference on Intelligent Robots and Systems, pp. 3779-3784.

Karlsson, et al., A Capacitive Sensor for the Detection of Humans in a Robot Cell, in 1993 IEEE Instrumentation and Measurement Technology Conference, pp. 164-166.

Kelly, et al., An Infrastructure-Free Automated Guided Vehicle Based on Computer Vision—An Effort to Make an Industrial Robot Vehicle that Can Operate without Supporting Infrastructure, IEEE Robotics & Automation Magazine, 2007, pp. 24-34.

Kochan, Robotic Production Assistants for Working Alongside the Human Operator, Assembly Automation, 2002, 22 (1):26-28.

(56) References Cited

OTHER PUBLICATIONS

Kontz, et al., Position/Rate Haptic Control of a Hydraulic Forklift, in ASME 2003 International Mechanical Engineering Congress and Exposition, pp. 801-808.

Lang, Evaluation of an Intelligent Collision Warning System for Forklift Truck Drivers in Industry, in International Conference on Digital Human Modeling and Applications in Health, Safety, Ergonomics and Risk Management, 2018, pp. 610-622.

Larsson, et al., Laser-Based Corridor Detection for Reactive Navigation, Industrial Robot: An International Journal, 2008, 35(1):69-79.

Lecking, et al., Variable Pallet Pick-Up for Automatic Guided Vehicles in Industrial Environments, in 2006 IEEE Conference on Emerging Technologies and Factory Automation, pp. 1169-1174.

Mehta, Robo 3.1 An Autonomous Wall Following Robot, May 1, 2008, 34 pages.

Meng, et al., Wall-Following by an Autonomously Guided Vehicle (AGV) Using a New Fuzzy-I (Integration) Controller, Robotica, 1999, 17(1):79-86.

Mitsou, et al., Visuo-Haptic Interface for Teleoperation of Mobile Robot Exploration Tasks, in the 15th IEEE International Symposium on Robot and Human Interactive Communication, 2006, pp. 157-163.

Mora, et al., Factory Management and Transport Automation, in 2003 IEEE Conference on Emerging Technologies and Factory Automation Proceedings, pp. 508-515.

Pacchierotti, et al., Evaluation of Passing Distance for Social Robots, in the 15th IEEE International Symposium on Robot and Human Interactive Communication, 2006, pp. 315-320.

Walter, et al., A Situationally Aware Voice-commandable Robotic Forklift Working Alongside People in Unstructured Outdoor Environments, Journal of Field Robotics, accepted 2014, 32(4):590-628.

Tsui, et al., Soft-Computing-Based Embedded Design of an Intelligent Wall/Lane-Following Vehicle, IEEE/ASME Transactions on Mechatronics, 2008, 13(1):125-135.

Raymond, Wire Guidance, Maintenance Manual, Sep. 1, 1995, 53 pages.

Roberts, et al., Reactive Navigation and Opportunistic Localization for Autonomous Underground Mining Vehicles, Information Sciences, accepted 2001, 145(1-2):127-146.

Saleh, et al., Soft Computing Techniques in Intelligent Wall Following Control for a Car-Like Mobile Robot, in 2009 3rd International Conference on Signals, Circuits and Systems, pp. 1-6, IEEE, 2009.

Scheidig, et al., Generating Persons Movement Trajectories on a Mobile Robot, in the 15th IEEE International Symposium on Robot and Human Interactive Communication, 2006, pp. 747-752.

Seraji, et al., Behavior-Based Robot Navigation on Challenging Terrain: A Fuzzy Logic Approach, IEEE Transactions on Robotics and Automation, 2002, 18(3):308-321.

Shackleford, et al., Performance Evaluation of Human Detection Systems for Robot Safety, Journal of Intelligent & Robotic Systems, 2016, 83(1):85-103.

Sisbot, et al., Implementing a Human-Aware Robot System, in the 15th IEEE International Symposium on Robot and Human Interactive Communication, 2006, pp. 727-732.

Tews, et al., Autonomous Hot Metal Carrier, in 2007 IEEE International Conference on Robotics and Automation, pp. 1176-1182.

\* cited by examiner

FLOOR CONVEYOR

CROSS-REFERENCE TO RELATED APPLICATIONS

The application claims the priority benefit of EP 16179517.4 filed Jul. 14, 2016, the contents of which is hereby incorporated by reference as if set forth in its entirety.

TECHNICAL ART

The present invention relates to a floor conveyor according to claim 1, a method according to claim 13 and a computer executable software according to claim 15.

BACKGROUND ART

It is known through the document WO 2012/115920 A2 of material handling vehicles to automatically implement steer maneuvers when entering one or more zones proximate to the vehicle. The technique according to this document uses several sensors, in one example, seven obstacle sensors, to detect objects.

SUMMARY OF THE INVENTION

The present invention provides an improved floor conveyor. This is achieved by a floor conveyor, a control unit and a sensor device, wherein the control unit may be operable to control the travel functions of the floor conveyor, wherein the sensor device may be arranged to be able to provide the control unit with sensor data, wherein the sensor device may be arranged such that it can detect objects in a plane, wherein the plane may be extending along a first side of the floor conveyor, wherein the plane comprises a stop section, wherein the floor conveyor may be arranged such that if an object is detected in the stop section the floor conveyor is then stopped by control of the travel function from the control unit upon receipt of a sensor data indicating the object is positioned in the stop section, and wherein the stop section may also extend along a section of a second side of the floor conveyor. In some embodiments the second side may be essentially perpendicular to the first side.

By having a sensor device that can detect on a first and a second side of the floor conveyor, a considerable improvement over the prior art can be achieved. To handle many sensor devices requires a complex structure of hardware and software, and more detection can be performed.

According to a further aspect of the disclosure there is proposed a floor conveyor according to the above, wherein the stop section additionally has an extension that can alter between a first configuration and a second configuration, wherein the first configuration the stop section has a side that has an angled side to the central symmetry line of the floor conveyor such that the stop section discloses a wedge shape with a narrowing width away from the floor conveyor in a perpendicular direction to the central symmetry line, wherein the second configuration discloses a shape with a constant width perpendicular to the symmetry line of the floor conveyor.

By having two configurations it may be possible to adapt the floor conveyor, such that, for example, an order picking operation can be optimized. The wedge shape provides so that the operator can move closer to the floor conveyor without stopping the floor conveyor. This can be important if the operator is controlling the floor conveyor with a remote control. Then if the operator is moving outside the floor conveyor for order picking as the floor conveyor is moving, the operator can be more effective as the stop section may be narrower. At the same time the stop section can have a second configuration where the area where the floor conveyor stops may be broader in width. This may be important when other persons other than the operator are moving close to the floor conveyor. It then, for example, may be beneficial that the floor conveyor stops earlier.

According to a further aspect of the disclosure there is proposed a floor conveyor according to the above, wherein the first configuration and the second configuration can be present at the same time, wherein one configuration may be present on a first side of the central symmetry line and the other may be present on the other side of the central symmetry line.

By having the two configurations at the same time it may be possible to have the operator work and operate on the side where the wedge shape is present, thus giving him an effective work space to move around in. At the same time on the other side of the floor conveyor, the area of the stop section can be larger and the floor conveyor can stop at an earlier moment if a person approaches the floor conveyor from this side.

According to a further aspect of the disclosure there is proposed a floor conveyor according to the above, wherein the first configuration and the second configuration can alter sides of the central symmetry line during operation, and in some embodiments, the first configuration may be applied on the side of the floor conveyor where a predetermined object is present.

This may be beneficial in certain situations, such as when performing order picking operations and the rack from which order picking is performed is changing from one side of the floor conveyor to the other side. Then the operator can either manually or the control unit can sense on which side the rack is positioned. In doing this the wedge shape of the stop section can be positioned on the side of the rack for the most efficient order picking. On the other side the stop section by the second configuration can be wider for other persons or operators in the warehouse.

According to a further aspect of the disclosure there is proposed a floor conveyor according to the above, wherein the plane comprises a further section adjacent and outside the first configuration of the stop section and when an object is detected inside the section, the floor conveyor may be configured to steer away from the object.

The floor conveyor can thereby move away from an object if it comes too close to the object for safe operation or for avoiding contact.

According to a further aspect of the disclosure there is proposed a floor conveyor according to any of the above wherein the plane comprises a further section adjacent and outside the further section and when an object is detected inside the section, the floor conveyor may be configured to keep a constant distance to this object.

For a floor conveyor that can be allowed to operate independently or to aid the operator in maneuvering it may be desirable that the floor conveyor can follow an object. The object in some embodiments may be a rack or shelf in a warehouse from which the operator is performing the order picker operation. This simplifies the order picker operation as the operator can move the floor conveyor by means of a simple remote control that may only be used for the start and stop of movement but not steering. It may be particularly advantageous if the operator is moving a longer distance close to an object of constant shape. Then the floor conveyor can aid the operator to maneuver thus easing the work process. According to a further aspect of the disclosure there is proposed a floor conveyor according to the above, wherein the sensor device may be mounted at an angle α with regard to the horizontal plane, wherein the plane may be extending at an angle α when compared with the horizontal plane.

By mounting the sensor device at an angle to the horizontal plane, a convenient way of monitoring a larger volume and area may be achieved. The use of only one single sensor makes it possible to monitor a substantial portion of the front of the floor conveyor opposite a load carrier. And the angle of the sensor may make it possible to more freely choose the position of the sensor device.

According to a further aspect of the disclosure there is proposed a floor conveyor according to the above, wherein the sensor device may be mounted at a predetermined distance from the surface on which the floor conveyor is supported, wherein this distance may be sufficient for the sensor device to detect objects on the first side and a section of the second side, and in some embodiments also sufficient to detect an object on a section of the third side of the floor conveyor.

The predetermined distance provides so that the sensor can detect at a further range than if the detecting device would be mounted adjacent the surface on which the floor conveyor is supported. And further the sensor device may be more protected from soiling. It may also be less likely to be damaged from contact. Further, it may be easier to service and keep clean.

According to a further aspect of the disclosure there is proposed a floor conveyor according to the above, wherein the first side may be positioned opposite a load carrier on the floor conveyor, perpendicular to the central symmetry line of the floor conveyor.

The side opposite the load carriers may be in general the front of the floor conveyor where it may be most important to monitor for objects when the floor conveyor is moving.

According to a further aspect of the disclosure there is proposed a floor conveyor according to the above, wherein the sensor device may be mounted in a central position on the longitudinal symmetry line of the floor conveyor.

With a central position it may be even easier to only implement a single sensor device for detecting more than one section of a side of the floor conveyor. It may also be easy to implement the first configuration and the second configuration of the plane with a high accuracy and good quality.

According to a further aspect of the disclosure there is proposed a floor conveyor according to the above, wherein the sensor device may be a laser sensor.

A laser sensor may be particularly reliable and easy to configure. They are not easily disturbed by, for example the use of pressurized air usage as, for example ultra sound detectors are prone to.

According to a further aspect of the disclosure there is proposed a floor conveyor according to the above, wherein the stop section further has an extension along a section of a third side of the floor conveyor, wherein the third side may be essentially perpendicular to the first side.

By using one sensor for detecting objects on three sides of the front section of the floor conveyor, it can be advantageous that the number of sensors can be reduced to a minimum, in some embodiments only one sensor is needed.

According to a further aspect of the disclosure there is disclosed a method for operating a floor conveyor according to any of the above, comprising the steps of:

a. applying a detection plane from a sensor device,
b. applying a section of the detection plane as a stop section in which if an object is detected the floor conveyor will be stopped, and
c. applying a first configuration of the stop section comprising a wedge shape on one side of the central symmetry line of the floor conveyor.

The method of the above steps has the same advantages as the discussed floor conveyor above. It is particularly innovative that the shape of the stop section allows for a larger area for the operator to move outside the floor conveyor.

According to a further aspect of the disclosure there is suggested a method according to the above, comprising at least one of the step/steps of:

c1. applying a second configuration of the stop section with a shape on the other side with a constant width to the central symmetry line.

This has the same advantages as described above, and can provide a larger stop section, for a desired side, and in some embodiments the side where the operator is not working.

c2. applying a further section outside the first configuration, in which if an object is detected in this section the floor conveyor will steer away from this object.

This step has the same advantages as c3 discussed below and the discussed floor conveyor above, it is as discussed an advantage that the floor conveyor itself can avoid and steer away from an object.

c3. applying a further constant distance section outside the further section in which if an object is detected the floor conveyor will keep a constant distance to the detected object.

This step has the same advantages as discussed above. It may be particularly advantageous if the operator is moving a longer distance close to an object of constant shape. Then the floor conveyor can aid the operator to maneuver, thus easing the work process. But even more favorable, in some situations, is that as discussed, the operator may be maneuvering the floor conveyor with a remote control.

It is also disclosed a computer executable software that when stored on and executed by a control unit of a floor conveyor according to any of the claims, executes the method according the above. By implementing the method as a computer executable software it is easier to perform the method automatically and repeatable. In some embodiments, the computer executable software may be described as a program stored in a non-transitory computer-readable medium.

DETAILED DESCRIPTION

The present disclosure relates to a floor conveyor comprising a sensor device for detecting objects. The floor conveyor can be any type of floor conveyor that is operable with such a sensor device. Non-limiting examples of such floor conveyors are order picker trucks, stacker trucks, pallet trucks, reach trucks, or tow tractors having a wagon or a space for material handling. The sensor device of the disclosure may be able to detect objects that enter or are positioned within a certain distance of the floor conveyor, in a plane extending outside the floor conveyor. One possible usage of a floor conveyor with a sensor device according to the disclosure may be an order picker truck that may be used with a remote control. In some embodiments, a sensor device may be required when using the remote control. In general the remote control may be a wireless remote control, in some embodiments only allowing to control start and stop of the movement of the floor conveyor. However, the use of a remote control is not mandatory for the disclosure.

A sensor device means one sensor device in the context of the present disclosure. Thus a group of sensor devices should not be construed to be a sensor device. However, if the one sensor device comprises several sensor elements for example in order to detect in different directions it is still to be construed as a sensor device according to this disclosure, in this case it is the intention that it should not be possible to separate the sensor elements from each other, without destruction of the sensor device.

Figure 1:
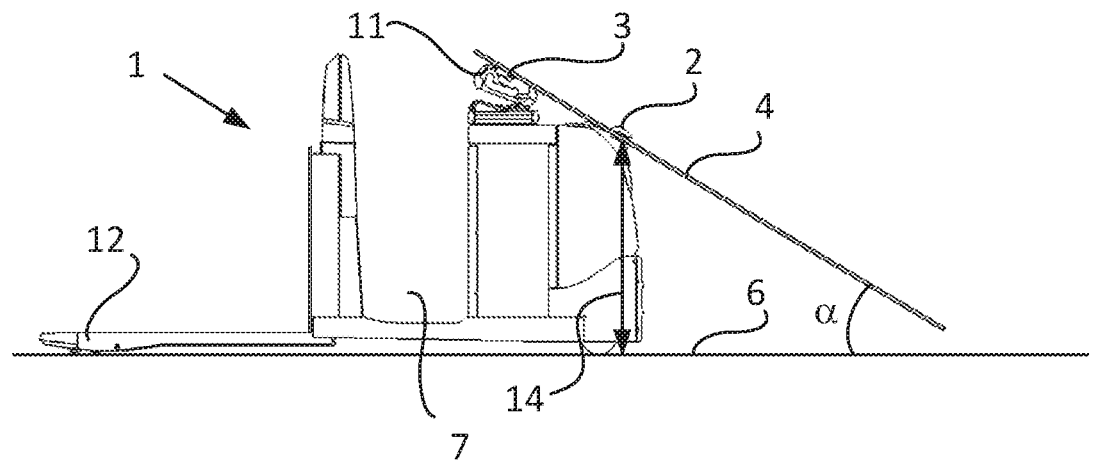
FIG. 1 shows a floor conveyor according to the present disclosure.
Figure 2:
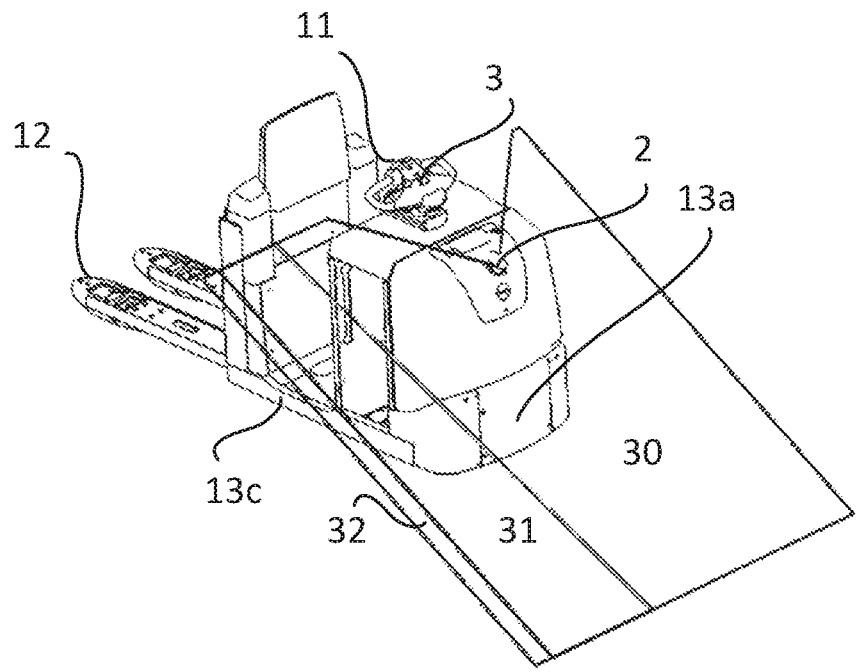
FIG. 2 shows a floor conveyor according to the present disclosure with a stop section with wedge form to the side 13c.
Figure 3:
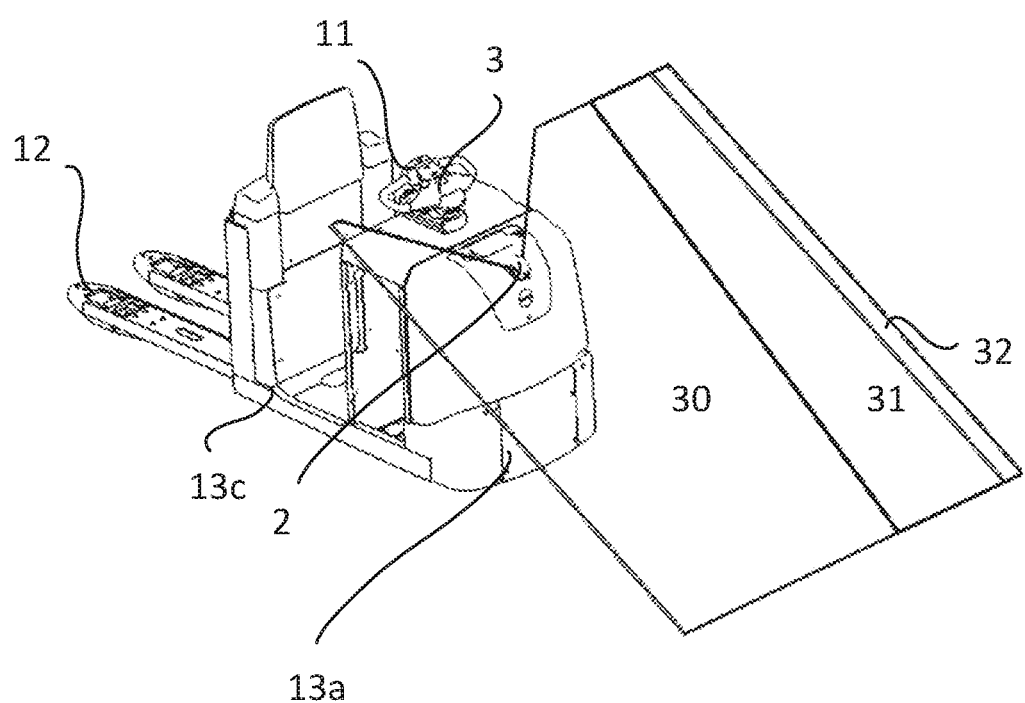
FIG. 3 shows a floor conveyor according to the present disclosure with a stop section with wedge form to the side opposite side 13c.

In FIG. 1 there is disclosed the floor conveyor 1 with the sensor device 2. The floor conveyor 1 further comprises the control unit 3 that may be able to control the sensor device 2 and may also be operable to control the travel functions of the floor conveyor 1. The sensor device 2 may be detecting objects in a plane 4. The plane 4 is best viewed in FIGS. 2 and 3, but the plane can also be seen from the side in FIG. 1. The sensor device 2 may be advantageously mounted at an angle $\alpha$ to the horizontal plane. The range of the plane 4 may be in the lower part ended above the surface 6 on which the floor conveyor 1 may be supported. This may leave a gap 7 to the surface 6. In some embodiments this may be made in practice by limiting the time slot for which measurement is made of the sent out sensor waves from the sensor. The reason for providing the gap is to avoid having a signal generated from the surface 6, when operating the floor conveyor 1. In general the floor conveyor also comprises an operator control 11 for example in the form of a handle 11 as seen in FIGS. 1-3. In general a load carrier 12 may also be present; this can be in the form of two forks as seen in FIGS. 1-3, but can also be in the form of a basket, a box, or a shelf on the floor conveyor 1. In some embodiments a trailer could be the load carrier.

The sensor device 2 can detect objects in the plane 4. The plane 4 can be divided into sections. This is in practice made by using time as a factor of controlling the sensor signals reflected back to the sensor. By predetermining different time ranges for reflection, different sections of the plane 4 can be used for different actions from the control unit 3 to the floor conveyor 1.

Figure 4:
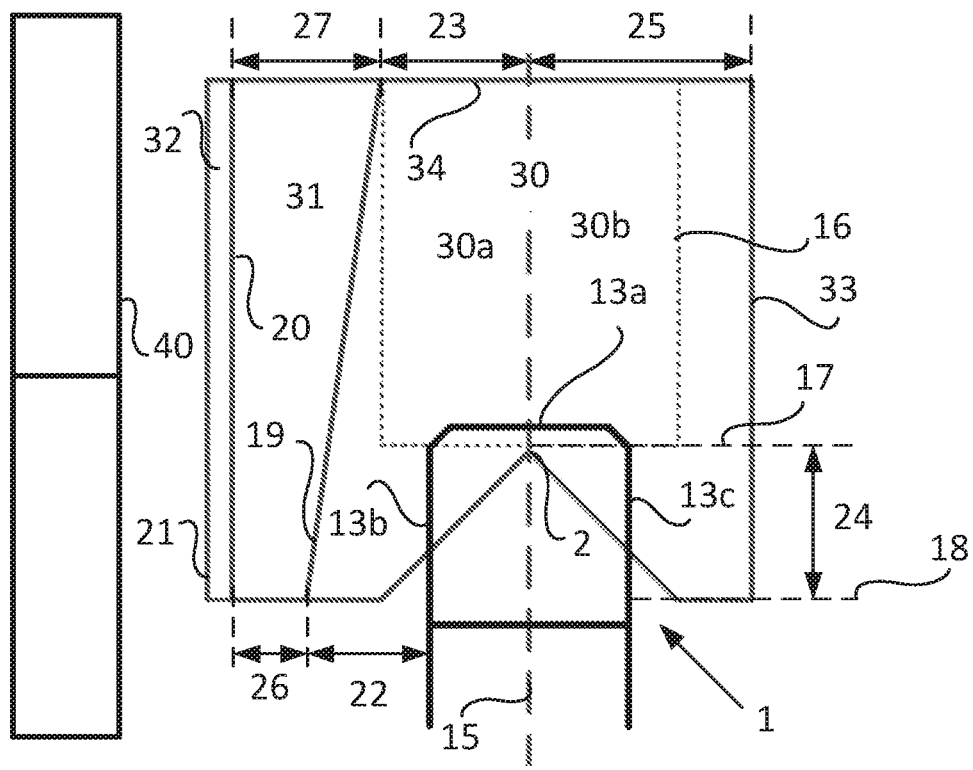
FIG. 4 shows the floor conveyor of FIG. 2 from above.
Figure 5:
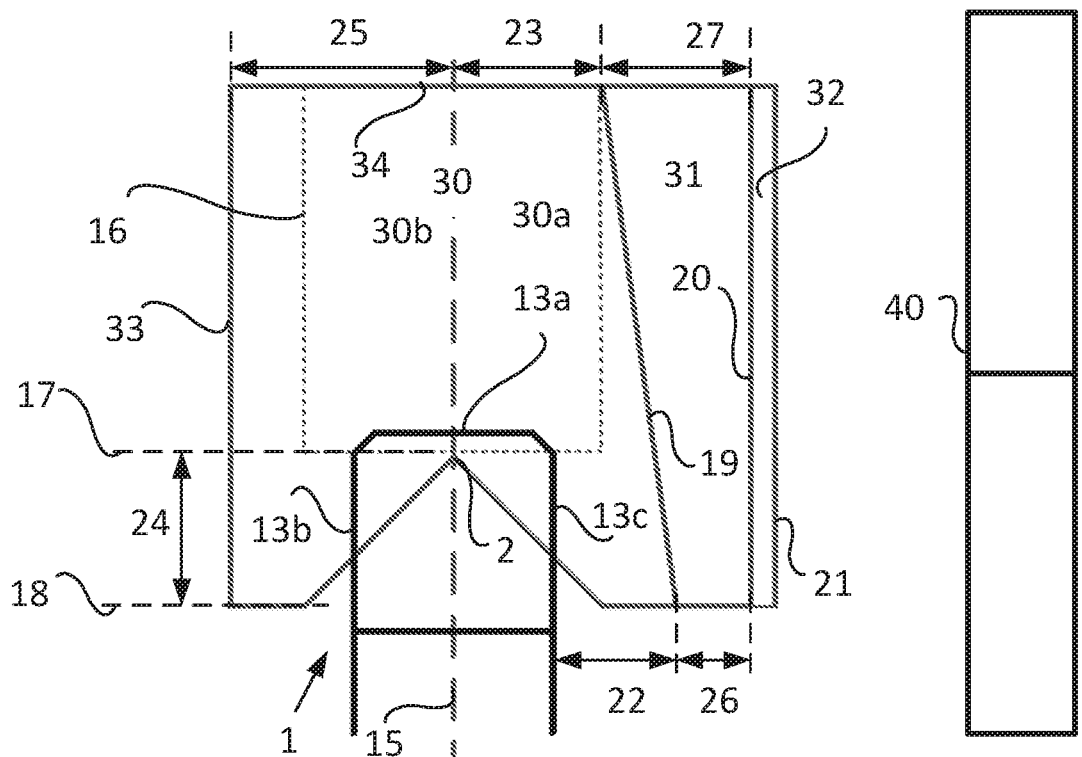
FIG. 5 shows the floor conveyor of FIG. 3 from above.

FIGS. 4 and 5 show the plane 4 from above. The plane may have an outer contour that is limited by predetermined borders comprising sides 21, 33 and the side 34. The plane comprises a stop section 30. In some embodiments, the stop section can never be larger in area than the plane 4, and it may be advantageous for it to be smaller than the complete coverage of the plane 4. If an object 40 is detected inside the stop section 30, the floor conveyor may be arranged to stop travel movement. The stop may be performed more in detail by the sensor device 2 sending a sensor data to the control unit 3, that then sends an order to a motor control unit (not shown) to stop the motor (not shown), and possibly apply a brake device (not shown). The plane 4 may extend along a first side 13a of the floor conveyor 1. As can be seen in the FIGS. 2 and 3, the side 13a is the transversal side that may be positioned opposite the load carrier 12. A perpendicular side 13b to the first side 13a may be projected along the longitudinal extension of the floor conveyor 1. The present disclosure relates primarily to a monitoring of two sides 13a, 13b by the same sensor device 2. The side 13b may be perpendicular to the side 13a. This is the normal shape of a floor conveyor. Of course it should be understood that perpendicular does not mean that the first side 13a and the second side 13b are straight, the sides can be curved and perpendicular means that the two sides intersect at an angle, and are not parallel to each other. However, for obvious reasons the first side can, for the entire disclosure, be chosen to be any side of the floor conveyor 1. When discussing sides it should be understood that the angled corners which are seen in FIGS. 4 and 5 are only examples of how a floor conveyor 1 may be designed. In general, if a determination is to be made the angled corners could be incorporated either to the first side 13a or to the other sides of choice.

The shape of the stop section 30 can be seen in FIGS. 4 and 5. A wedge shape may be present and can be seen to be limited by outer end in the form of the line, i.e., side 19. The shape of this part of the stop section 30 can be angled to the central symmetry line 15 and has a narrowing width away from the floor conveyor 1, in a perpendicular direction to the central symmetry line 15. The stop section 30 is disclosing two configurations 30a, 30b. The configuration 30a discloses the wedge shape to the central symmetry line 15. The configuration 30b discloses a constant width from the central symmetry line 15 to the outer end 33 of the stop section 30. The configuration 30b discloses a larger area outside the sides 13a, 13b and 13c where a stop may be implemented if an object is detected in this configuration.

It is to be understood that it is in general so that the first configuration 30a and the second configuration 30b are subsections to the stop section 30. It is thinkable that two first configuration sections 30a are active at the same time on respective sides of the central symmetry line 15. The same may be achievable for the second configuration 30b. However, in most cases it may be desirable that the first configuration 30a and the second configuration 30b are present at the same time on a respective side of the central symmetry line 15 of the floor conveyor.

The floor conveyor 1 may be arranged to be able to alter between the first configuration 30a and the second configuration 30b. The operator can either manually alter the configuration of the stop section 30, or the control unit 3 can sense on which side a predetermined object 40 is positioned by means of the sensor device 2, or apply a desired configuration 30a, 30b on different sides of the floor conveyor 1. The predetermined object 40 is generally of a rack or shelf in a warehouse although other objects are possible. The plane 4 can comprise a further section 31 as seen in FIGS. 4 and 5. By dividing the plane into a further section 31 new functions can be assigned if objects enter this section 31. The function of section 31 in some situations may be beneficial to be that if an object 40 enters this section 31 the floor conveyor 1 may be arranged to steer away from the object

40. This is performed by cooperation between the sensor device 2 and the control unit 3, controlling the maneuvering of the floor conveyor 1.

Outside the further section 31 and adjacent this section a still further section 32 can be arranged. The function that may be assigned to section 32 is that the floor conveyor 1 may be configured to be able to keep a constant distance to the object 40, i.e., follow this object. This may be advantageously made by generally constantly determining that the object does not exit the section 32 by the sensor device 2 and the control unit 3 applying a straight travel by the floor conveyor 1. Following objects in some embodiments may be performed only when driving with a remote control device. The predetermined distance at which the floor conveyor 1 can follow the object 40, will reflect on how the follow section 32 is positioned with regard to the side 13*b*, 13*c* on the floor conveyor 1. A smaller distance will be reflected as a follow section 32 that may be positioned closer to the side 13*b*, 13*c* of the floor conveyor 1 on which the object 40 to be followed is positioned.

Figure 7A:
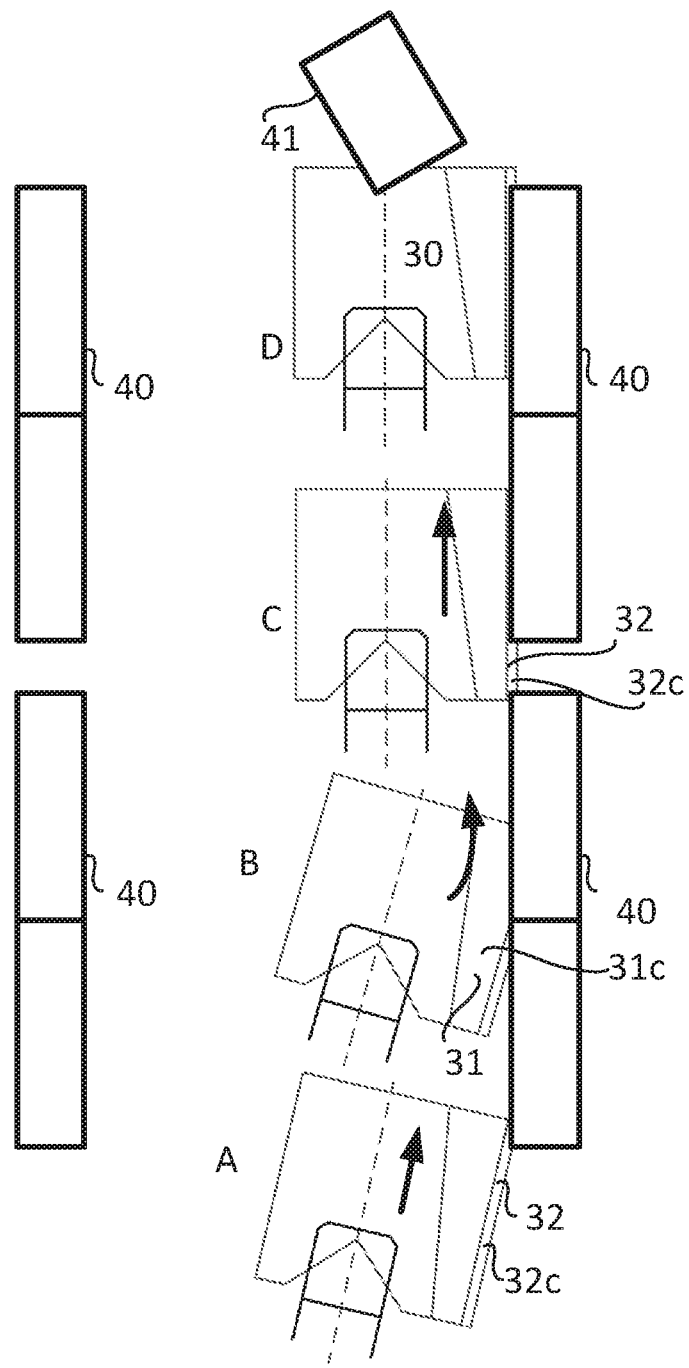
FIG. 7a shows the follow function in one general embodiment, according to the present disclosure.
Figure 7B:
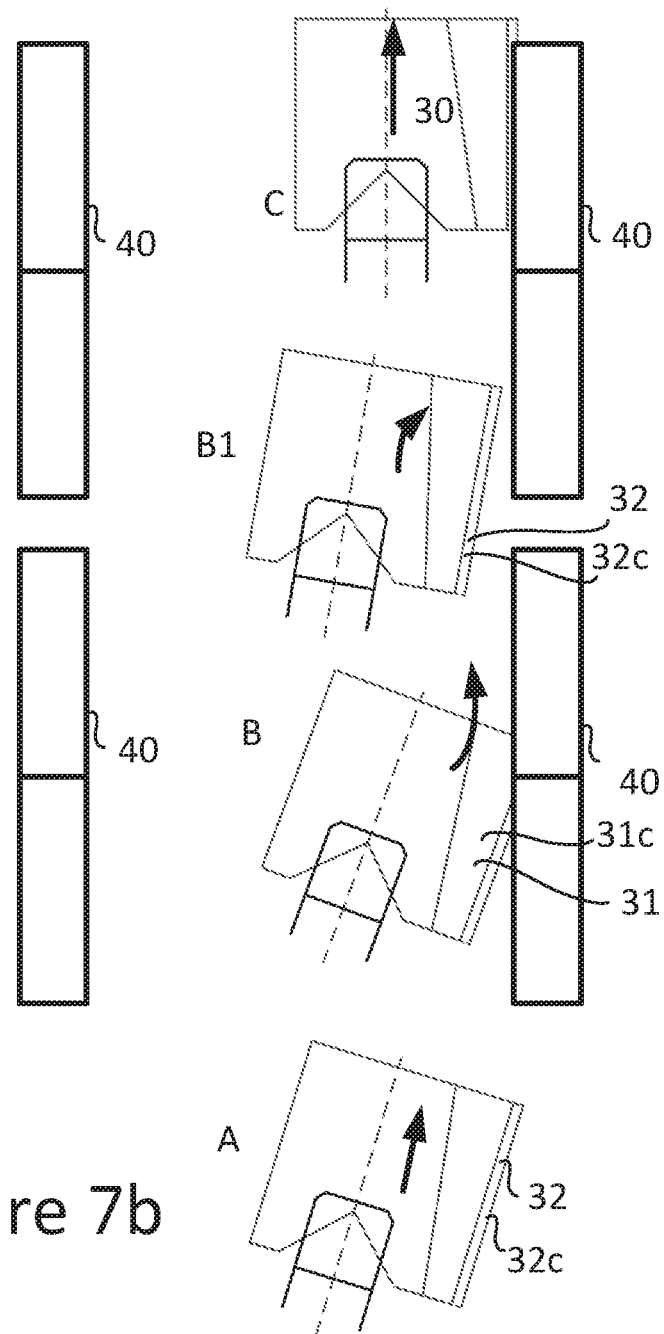
FIG. 7b shows the follow function in one general embodiment, according to the present disclosure.
Figure 8:
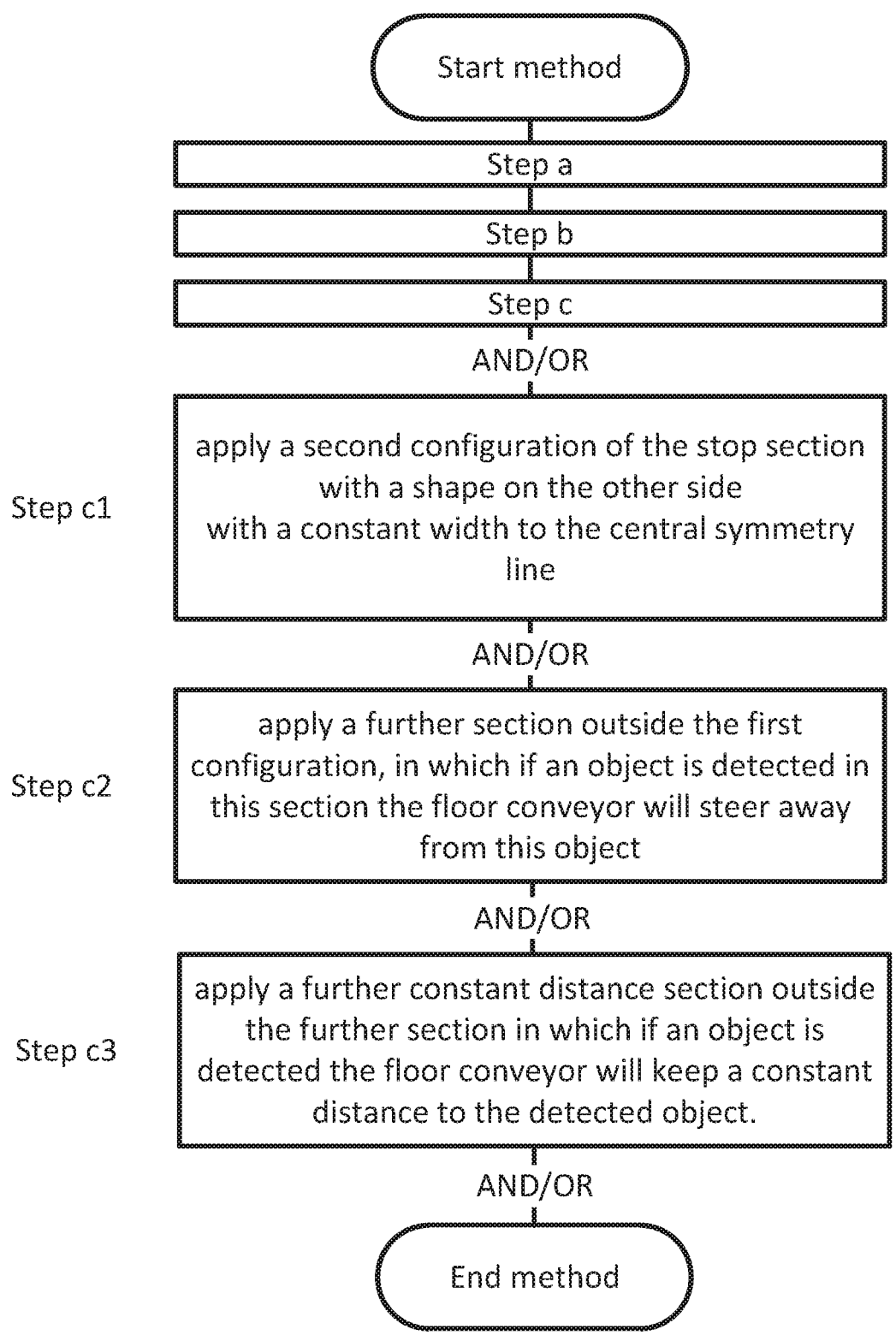
FIG. 8 shows a further method according to the present disclosure.

In FIGS. 7*a* and 7*b* the follow function is in general to be further explained as that it is arranged at the floor conveyor 1. When the object 40 is detected, the floor conveyor 1 may follow the object by moving in a straight line as long as the object is in the section 32, see FIG. 7*a* position A. As the floor conveyor 1 moves forward it might happen so that the object 40 may be positioned within the section 31. The floor conveyor 1 can then steer away from the object 40, see position B in FIG. 7*a*, such that the object can again be positioned in the section 32, see position C in FIG. 7*a*. If instead the object of choice to follow is object 40, and object 40 is not detected in the section 32 and not in the stop section 30 or the steer away section 31, the floor conveyor 1 may be arranged to steer towards the object 40, FIG. 7*b* position B1. The steer away and the steer towards the object 40 may be advantageously made at small angles, e.g., 5 degrees or more or less to the longitudinal extension of the object or the aisle. Stop is disclosed in FIG. 7*a* position D where an object 41 has entered the stop section 30. The plane of FIGS. 7*a* and 7*b* does not have the shape as disclosed further down with sections 31*b*, *c* and 32*b*, *c*, but the follow function can be the same.

By having the further section 31 and the further section 32, an improved performance for the operator may be achieved as if he is operating within the further section 32 the floor conveyor will keep a constant distance to him or if he is entering the section 32 the floor conveyor will steer away from him. The steer away operation may be made with an angle of 5 degrees or more or less. It is also possible to use the fact that no object may be detected in any of the sections 30, 31, 32, and then steer towards an object 40. However, this may only be possible if the object 40 has previously been detected. For any aspect above the side 13*b*, 13*c* on which the floor conveyor 1 may be arranged to search for and follow an object 40 may be positioned essentially perpendicular to the first side 13*a*. This is not mandatory, but in general it may be beneficial that the floor conveyor is travelling forward with the side 13*a* in front and the two other sides being 13*b* and 13*c* being parallel and essentially perpendicular to the first side 13*a*.

In some embodiments the sensor device 2 may be mounted at an angle α to the horizontal plane. By adjusting the angle α the floor conveyor can be adapted to different uses. If a smaller angle is used the plane 4 will have a longer range on side 13*a*, FIG. 4, of the floor conveyor. If a larger angle α is used a shorter extension of the plane 4 is achieved. By the angle α may be provided that only one sensor can be used for detection of objects supported on the surface 6 despite that the sensor device 2 can be positioned higher up on the floor conveyor 6. By having the inclined plane 4, an object entering the plane 4 from the most likely direction i.e., from the side 13*a*, the object can be detected early at a low point of the plane 4.

The sensor device 2 may be advantageously mounted at a predetermined distance 14, FIG. 1 from the surface 6. In some situations if may be beneficial for the distance 14 to be at the upper portion of the housing of the floor conveyor 1. It should be understood that lower positions may be possible, but it may be desired to keep the sensor device 2 away from the surface 6 in order to protect it from contact and getting soiled. It may also be advantageous to have it higher in order to be able to detect objects protruding in space and not necessarily being supported on the surface 6. In order for the sensor device 2 to detect on further sides 13*b*, and even side 13*c*, a certain distance, height over the surface 6 is required.

In some embodiments the sensor device 2 may be mounted in a central position on the longitudinal symmetry line 15 of the floor conveyor 1. This is convenient as it gives a good view of the surroundings. A laser sensor 2 may be advantageously used as the sensor device 2. The laser sensor can be applied to monitor a plane. Any laser sensor applicable to this is usable. In some situations it may be beneficial that the laser sensor 2 can monitor more than 180 degrees in front of it, advantageously more than 240 degrees or even more than 300 degrees. This allows for detecting objects on side 13*a*, 13*b* and 13*c*, in particular when the sensor device 2 is mounted a bit retracted from the most protruding point of any side to be monitored, such as side 13*a* as seen in FIG. 1.

In some embodiments the sensor device 2 may be arranged to be able to monitor a first side 13*a*, a second side 13 and also a third side 13*c*. This may allow for the use of only one single sensor device 2 for performing tasks that used many sensors before. This may be advantageously made by using a sensor that can detect in a plane 4. Improvements are achieved by mounting on the central symmetry line 15 and at a predetermined distance 14 from the surface 6 on which the floor conveyor is supported.

It is a further aspect of the disclosure that the sensor device 2 for any of the aspects as discussed may be the sole sensor device 2 on board the floor conveyor 1 that can detect an object outside the floor conveyor circumference.

Figure 6:
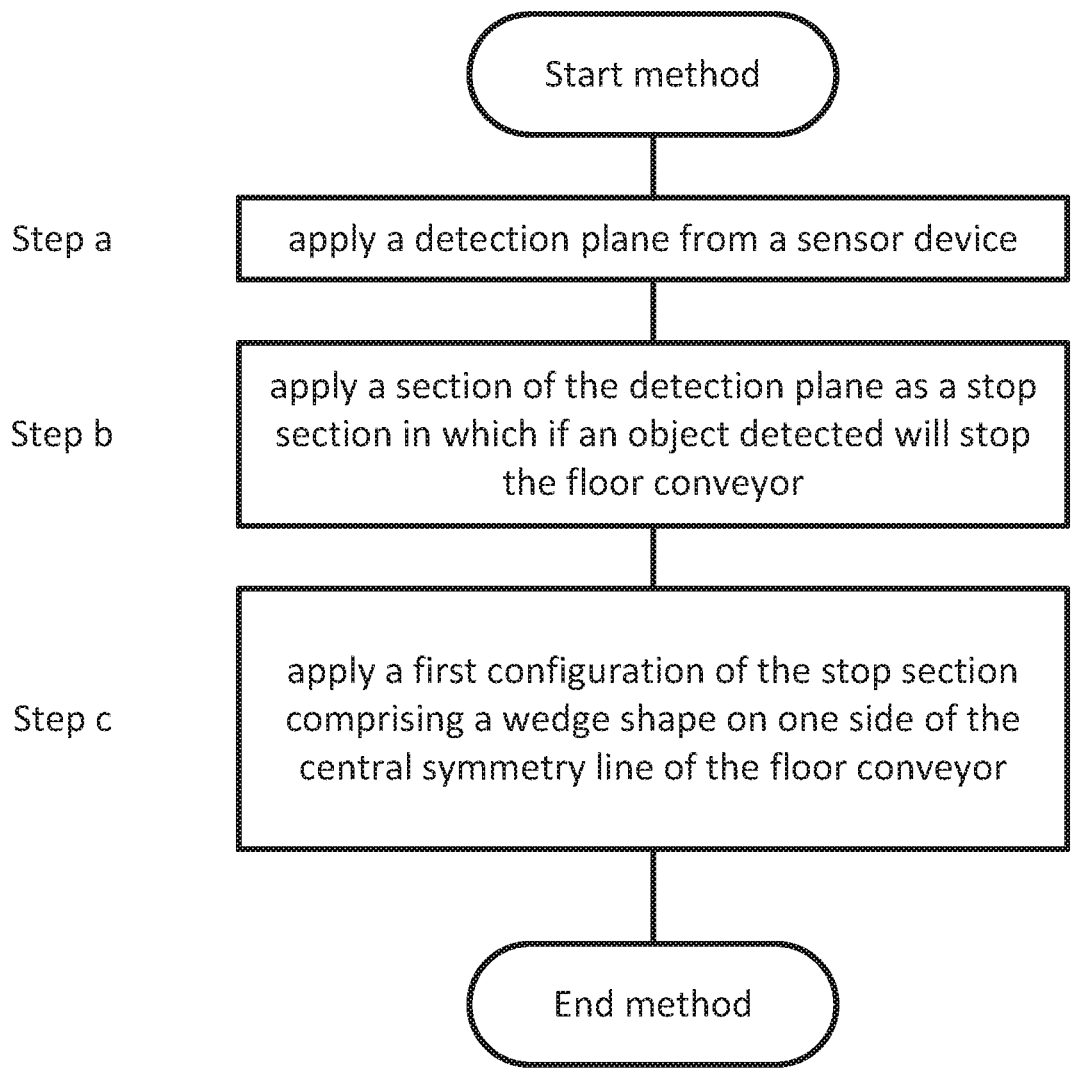
FIG. 6 shows a method according to the present disclosure.

A method for operating a floor conveyor of the above is disclosed, see FIG. 6. The following steps can be comprised in this method:

a. applying a detection plane from a sensor device, b. applying a section of the detection plane as a stop section in which if an object is detected the floor conveyor will be stopped, and c. applying a first configuration of the stop section comprising a wedge shape on one side of the central symmetry line of the floor conveyor.

Step a means that the plane may be applied in a direction outside the floor conveyor where detection of objects are desired.

Step b means that part of or the whole plane may have a particular function when a detection of an object is made within the plane. The term stopped means that travel operation that may be initiated before the detection of the object may be dismissed and stopped. Thus in order to further travel with the floor conveyor the operator needs to take action, either by steering away or moving the detected object.

Step c means that a restriction to the stop may be made such that the area of the stop section is diminished thus giving an operator the possibility to move outside the floor conveyor without preventing operation.

The method can further be developed by adding at least one of further steps, see FIG. 7a; including c1. applying a second configuration of the stop section with a shape on the other side with a constant width to the central symmetry line, c2. applying a further section outside the first configuration, in which if an object is detected in this section the floor conveyor will steer away from this object, c3. applying a further constant distance section outside the further section in which if an object is detected the floor conveyor will keep a constant distance to the detected object.

Step c1 gives a plane as discussed above with a predictable reaction from the floor conveyor, providing space for persons moving on this side of the floor conveyor.

Step c2 gives help to the operator to operate as an object entering this section will make the floor conveyor steer away. This section allows also for space for the operator moving on the side of the floor conveyor having the first configuration.

Step c3 helps the operator when he maneuvers the floor conveyor with a remote control or with the control handle on the floor conveyor as he need not interact if following a long object such as a rack or a shelf in a warehouse.

By implementing the method as computer executable software it may be easier to perform the method automatically and repeatable. The software is in general stored on the control unit of the floor conveyor. The start and execution of the software can for example be made by login to the floor conveyor, or by manual start-up of the operator.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of the embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

Although the above discussion discloses various exemplary embodiments, it should be apparent that those skilled in the art can make various modifications that will achieve some of the disclosed advantages without departing from the true scope of the disclosure.

The invention claimed is:

1. A floor conveyor comprising:
a control unit operable to control a travel function of the floor conveyor;
a sensor device arranged to provide the control unit with sensor data, the sensor device arranged to generate a detection plane to detect objects, wherein the detection plane is to extend along a first side of the floor conveyor, the detection plane including a stop section,
wherein the control unit is configured to stop the floor conveyor when an object is detected within the stop section of the detection plane;
wherein the detection plane is oriented at an angle relative to a horizontal plane; and
wherein the detection plane is to extend from the sensor device toward a surface on which the floor conveyor is supported, and wherein a range of the detection plane is configured to leave a gap between a lowermost end of the detection plane and the surface.

2. The floor conveyor of claim 1, wherein the sensor device is configured to detect objects on the first side, a section of a second side, and a section of a third side of the floor conveyor.

3. The floor conveyor of claim 2, wherein the first side of the floor conveyor is positioned opposite a load carrier on the floor conveyor.

4. The floor conveyor of claim 1, wherein the sensor device is mounted on the floor conveyor such that a longitudinal symmetry line of the floor conveyor intersects a portion of the sensor device.

5. The floor conveyor of claim 1, wherein the sensor device is a laser sensor.

6. The floor conveyor of claim 1, wherein the sensor device is configured to generate the detection plane such that the stop section has a side that is angled relative to a symmetry line of the floor conveyor.

7. The floor conveyor of claim 6, wherein the sensor device is configured to generate the detection plane such that the detection plane includes a follow section and a steer away section;
wherein the control unit is configured to cause the floor conveyor to keep a constant distance from an object detected within the follow section; and
wherein the control unit is configured to cause the floor conveyor to steer away from an object detected within the steer away section.

8. The floor conveyor of claim 1, wherein the stop section is wedge shaped, the wedge shape having a narrowing width as the stop section extends away from the floor conveyor.

9. The floor conveyor of claim 1, wherein the stop section includes a first subsection and a second subsection, and wherein the sensor device is configured to alter at least one of a shape or a position of the first subsection in response to an object being detected.

10. A floor conveyor comprising:
a sensor device, the sensor device configured to:
generate a detection plane having a first subsection and a second subsection, the detection plane having a stop section;
alter at least one of a shape or a position of the first subsection within the detection plane; and
a control unit in communication with the sensor device, the control unit configured to stop the floor conveyor if an object is detected within the stop section of the detection plane,
wherein the stop section is wedge shaped, the wedge shape having a narrowing width as the stop section extends away from the floor conveyor.

11. The floor conveyor of claim 10, wherein the sensor device is further configured to alter at least one of a shape or a position of the second subsection.

12. The floor conveyor of claim 10, wherein the floor conveyor is configured to:

generate the first subsection on a first side of a symmetry line of the floor conveyor, using the sensor device;

generate the second subsection on a second side of the symmetry line of the floor conveyor, using the sensor device;

alter the position of the first subsection such that the first subsection is on the second side of the symmetry line, using the sensor device; and alter the position of the second subsection such that the second subsection is on the first side of the symmetry line, using the sensor device.

13. The floor conveyor of claim 10, wherein the stop section has a first side that is oriented at an angle relative to a symmetry line of the floor conveyor; and wherein the stop section has a second side oriented substantially parallel to the symmetry line of the floor conveyor.

14. The floor conveyor of claim 10, wherein the detection plane is directed toward a surface on which the floor conveyor is supported, and wherein a range of the detection plane is configured to leave a gap between a lowermost end of the detection plane and the surface.

15. A floor conveyor comprising:

a sensor device, the sensor device configured to generate a detection plane having a stop section, the detection plane extending toward a surface upon which the floor conveyor is supported;

a control unit in communication with the sensor device, the control unit configured to stop the floor conveyor if an object is detected within the stop section of the detection plane; and wherein a side of the stop section is to be oriented at an angle relative to a straight path of travel of the floor conveyor;

wherein the detection plane includes a follow section; and wherein the control unit is configured to cause the floor conveyor to follow an object that is detected within the follow section.

16. The floor conveyor of claim 15, wherein the detection plane includes a steer away section; and wherein the control unit is configured to cause the floor conveyor to maneuver away from an object that is detected within the steer away section.

17. The floor conveyor of claim 15, wherein the sensor device is configured to leave a gap between a lowermost end of the detection plane and the surface.

18. The floor conveyor of claim 15, wherein the detection plane includes a first subsection and a second subsection, and wherein the sensor device is configured to alter at least one of a shape or a position of the second subsection.

* * * * *